(12) United States Patent
Ryoo et al.

(10) Patent No.: US 10,945,102 B2
(45) Date of Patent: Mar. 9, 2021

(54) METHOD AND APPARATUS FOR TRANSMITTING AND RECEIVING IN COMMUNICATION SYSTEM

(71) Applicants: Samsung Electronics Co., Ltd, Gyeonggi-do (KR); Korea Advanced Institute of Science and Technology, Daejeon (KR)

(72) Inventors: Sun-Heui Ryoo, Gyeonggi-do (KR); Dongseok Roh, Daegu (KR); Minhoe Kim, Daejeon (KR); Dong-Ho Cho, Seoul (KR); Nam-I Kim, Daegu (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 197 days.

(21) Appl. No.: 15/368,536

(22) Filed: Dec. 2, 2016

(65) Prior Publication Data
US 2017/0164337 A1    Jun. 8, 2017

(30) Foreign Application Priority Data
Dec. 2, 2015    (KR) .......................... 10-2015-0170724

(51) Int. Cl.
| | |
|---|---|
| *H04W 4/08* | (2009.01) |
| *H04L 5/00* | (2006.01) |
| *H04L 1/18* | (2006.01) |
| *H04W 72/04* | (2009.01) |
| *H04L 5/14* | (2006.01) |

(52) U.S. Cl.
CPC ............. *H04W 4/08* (2013.01); *H04L 1/1854* (2013.01); *H04L 1/1887* (2013.01); *H04L 5/0037* (2013.01); *H04L 5/0055* (2013.01); *H04L 5/1469* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 8,861,450 | B2 * | 10/2014 | Kim .................... | H04W 72/042 370/329 |
| 2009/0225708 | A1 * | 9/2009 | Harada ................. | H04L 1/0025 370/329 |
| 2010/0113082 | A1 * | 5/2010 | Ishii .................. | H04W 72/0406 455/509 |

(Continued)

FOREIGN PATENT DOCUMENTS

| | | | | |
|---|---|---|---|---|
| EP | 2704345 | A1 * | 3/2014 | ........... H04L 1/1812 |
| KR | 1020150087805 | | 7/2015 | |

*Primary Examiner* — Noel R Beharry
*Assistant Examiner* — Rodrick Mak

(57) ABSTRACT

The present disclosure relates to a pre-5th-generation (5G) or 5G communication system to be provided for supporting higher data rates beyond 4th-generation (4G) communication system such as a long term evolution (LTE). A method for transmitting data in a base station (BS) in a communication system is provided. The method includes transmitting data to a plurality of stations (STAs) included in a group on a first sub-frame based on a schedule preset based on a time division duplexing (TDD) scheme; and receiving acknowledgement (ACK) signals from each of the plurality of STAs on a second sub-frame after a first interval from the first sub-frame.

6 Claims, 14 Drawing Sheets

[ SUBFRAME 2 (UL) ]

[ SUBFRAME 6 (DL) ]

(56) References Cited

U.S. PATENT DOCUMENTS

| | | | | |
|---|---|---|---|---|
| 2010/0177717 | A1* | 7/2010 | Sung | H04W 72/042 370/329 |
| 2011/0128941 | A1* | 6/2011 | Ishii | H04B 1/59 370/336 |
| 2013/0215865 | A1* | 8/2013 | Lee | H04W 52/04 370/329 |
| 2014/0328281 | A1* | 11/2014 | Ko | H04L 1/1861 370/329 |
| 2014/0355493 | A1* | 12/2014 | Niu | H04L 12/189 370/280 |
| 2015/0049624 | A1* | 2/2015 | Sun | H04W 72/082 370/252 |
| 2015/0103725 | A1* | 4/2015 | Sun | H04W 4/08 370/312 |
| 2015/0189642 | A1* | 7/2015 | Yang | H04L 1/1861 370/311 |
| 2016/0135143 | A1* | 5/2016 | Won | H04W 72/005 370/312 |
| 2016/0174230 | A1* | 6/2016 | Benjebbour | H04W 52/346 370/329 |
| 2016/0308684 | A1* | 10/2016 | Zhu | H04W 72/005 |
| 2017/0019930 | A1* | 1/2017 | Lee | H04W 74/0833 |
| 2017/0150480 | A1* | 5/2017 | Kim | H04W 72/02 |
| 2017/0214607 | A1* | 7/2017 | Kim | H04W 28/04 |
| 2018/0063819 | A1* | 3/2018 | Saito | H04B 7/04 |
| 2018/0123765 | A1* | 5/2018 | Cao | H04L 1/1861 |
| 2018/0139586 | A1* | 5/2018 | Park | H04W 4/06 |
| 2018/0310330 | A1* | 10/2018 | Chun | H04L 5/0053 |

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.2

| UL/DL configuration | \multicolumn{10}{c}{Subframe n} |
|---|---|---|---|---|---|---|---|---|---|---|

| UL/DL configuration | 0 | 1 | 2 | 3 | 4 | 5 | 6 | 7 | 8 | 9 |
|---|---|---|---|---|---|---|---|---|---|---|
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG.3

| TDD UL/DL configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG.4

[ SUBFRAME 0 (DL) ]

[ SUBFRAME 1 (DL) ]

| STA 1 | STA 2 | DATA TRANSMISSION BETWEEN BS AND STA |
|---|---|---|
| ACK | ACK | TRANSMIT NEXT DATA ACCORDING TO SCHEDULE |
| NACK | NACK | RETRANSMIT DATA ACCORDING TO SCHEDULE |
| NACK | ACK | REQUESTING BS TO RETRANSMIT DATA |
| ACK | NACK | RETRANSMIT DATA TO STA 2 IN STA 1 AND BS |

[ SUBFRAME 7 (UL) ]

[ SUBFRAME 2 (UL) ]

[ SUBFRAME 6 (DL) ]

(a)

(b)

METHOD AND APPARATUS FOR TRANSMITTING AND RECEIVING IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Dec. 2, 2015 in the Korean Intellectual Property Office and assigned Serial No. 10-2015-0170724, the entire disclosure of which is incorporated herein by reference.

TECHNICAL FIELD

The present disclosure relates to a method and apparatus for transmitting and receiving data in a communication system, and more particularly, to a method and apparatus for transmitting and receiving data in a communication system supporting a non-orthogonal multiple access (NOMA) scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system may be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Radio access technologies support multiple access schemes for a plurality of user terminals to access and sharing system resources at the same time. The multiple access schemes may be classified into an orthogonal multiple access (OMA) scheme, e.g., a time division multiple access (TDMA) scheme, a frequency division multiple access (FDMA) scheme, an orthogonal frequency division multiple access (OFDMA), and/or the like and a NOMA scheme, e.g., code division multiple access (CDMA) scheme, and/or the like.

An OMA scheme which is based on an OFDMA scheme and a single carrier (SC)-FDMA scheme among the multiple access schemes is used as a standard of 4th generation mobile communication systems in a long-term evolution (LTE) and a long-term evolution advanced (LTE-A).

The OFDMA scheme has been considered as an optimal selection for achieving a performance of a good system-level throughput with a simple detecting operation in a receiver. For extending spectrum efficiency for future use, a NOMA scheme provides the wider spectrum among stations (STAs) even though using the same amount of resources, so the superiority of the NOMA scheme has been well known in an aspect of spectrum efficiency. In the NOMA scheme, an STA needs to decode data of other STA received from a BS, and to transmit an acknowledgement (ACK) signal including ACK information to the BS according to the decoding result.

However, a NOMA scheme using a simple spreading code applied to 3rd generation (3G) systems may not completely use a potential gain of a NOMA scheme. So, a NOMA scheme which is based on dirty paper coding (DPC) has been proposed. However, implementation of the DCP is complex and the DCP is sensitive to delay in transmission of channel status information as feedback information.

Generally, reliability for transmission of an ACK signal needs to be guaranteed. Specially, an issue of accuracy for an ACK signal may occur in a NOMA scheme which is based on a successive interference cancellation (SIC) scheme, so there is a need for an alternative scheme.

So, there is a need for a scheme of effectively transmitting and receiving data in a base station (BS) and stations (STAs) in a communication system supporting a NOMA scheme.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for transmitting and receiving data in a communication system.

Another aspect of the present disclosure is to provide an apparatus and method for transmitting and receiving data in a communication system supporting a NOMA scheme.

Another aspect of the present disclosure is to provide an apparatus and method for transmitting and receiving data among a BS and STAs based on a time division duplexing (TDD) scheme in a communication system supporting a NOMA scheme.

Another aspect of the present disclosure is to provide an apparatus and method for transmitting and receiving data by considering a distance between a BS and an STA in a communication system supporting a NOMA scheme.

In accordance with an aspect of the present disclosure, a method for transmitting data in a base station (BS) in a communication system is provided. The method includes transmitting data to a plurality of stations (STAs) included in a group on a first sub-frame based on a schedule preset based on a time division duplexing (TDD) scheme; and receiving acknowledgement (ACK) signals from each of the plurality of STAs on a second sub-frame after a first interval from the first sub-frame.

In accordance with another aspect of the present disclosure, a method for receiving data in a station (STA) in a communication system is provided. The method includes receiving, from a base station (BS), data transmitted on a group basis through a first sub-frame based on a schedule preset based on a time division duplexing (TDD) scheme; and transmitting, to the BS, an acknowledgement (ACK) signal based on the received data on a second sub-frame after a first interval from the first sub-frame.

In accordance with another aspect of the present disclosure, a base station (BS) in a communication system is provided. The BS includes a transmitter configured to transmit data to a plurality of stations (STAs) included in a group on a first sub-frame based on a schedule preset based on a time division duplexing (TDD) scheme; and a receiver configured to receive acknowledgement (ACK) signals from each of the plurality of STAs on a second sub-frame after a first interval from the first sub-frame.

In accordance with another aspect of the present disclosure, a station (STA) in a communication system is provided. The STA includes a receiver configured to receive, from a base station (BS), data transmitted on a group basis through a first sub-frame based on a schedule preset based on a time division duplexing (TDD) scheme; and a transmitter configured to transmit, to the BS, an acknowledgement (ACK) signal based on the received data on a second sub-frame after a first interval from the first sub-frame.

Other aspects, advantages, and salient features of the disclosure may become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

FIG. 2 illustrates a table for an uplink and downlink schedule per configuration in a long-term evolution time division duplexing (LTE TDD) scheme according to an embodiment of the present disclosure;

FIG. 3 illustrates a table for an uplink hybrid automatic repeat and request (HARQ) schedule in an LTE TDD scheme according to an embodiment of the present disclosure;

FIG. 4 illustrates another table for a downlink HARQ schedule in an LTE TDD scheme according to an embodiment of the present disclosure;

Throughout the drawings, it should be noted that like reference numbers are used to depict the same or similar elements, features, and structures.

DETAILED DESCRIPTION

Figure 1:
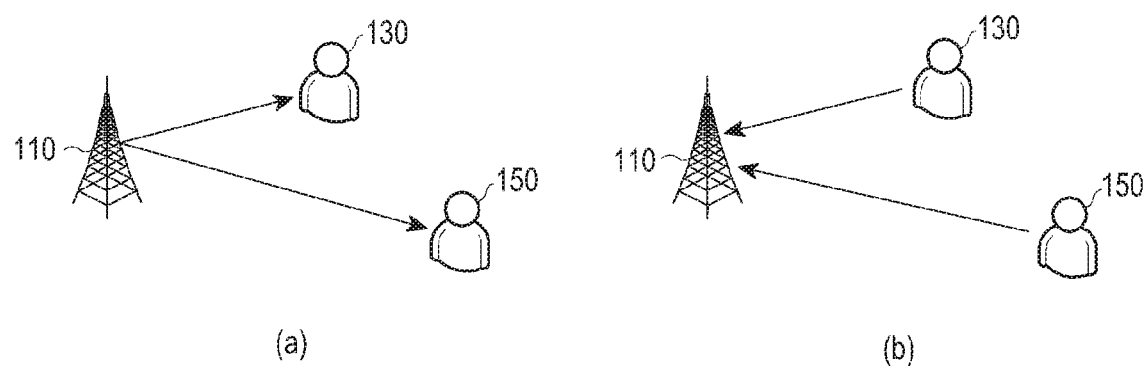
FIG. 1 illustrates an example of a communication system supporting a NOMA scheme according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art may recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth may be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It may be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HIVID), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it may be apparent to one having ordinary skill in the art that an electronic device according to various embodiments of the present disclosure is not limited to the foregoing devices.

According to various embodiments of the present disclosure, for example, a transmitting apparatus or a receiving apparatus may be a station (STA).

According to various embodiments of the present disclosure, for example, a transmitting apparatus or a receiving apparatus may be a base station (BS).

In various embodiments of the present disclosure, it may be noted that the term STA may be interchangeable with the term user equipment (UE), wireless communication terminal, mobile station (MS), wireless terminal, mobile device, and/or the like.

In various embodiments of the present disclosure, it may be noted that the term BS may be interchangeable with the term evolved node B (eNB), access point (AP), and/or the like.

An embodiment of the present disclosure provides an apparatus and method for transmitting and receiving data in a communication system.

An embodiment of the present disclosure provides an apparatus and method for transmitting and receiving data in a communication system supporting a non-orthogonal multiple access (NOMA) scheme.

An embodiment of the present disclosure provides an apparatus and method for transmitting and receiving data among a BS and STAs based on a time division duplexing (TDD) scheme in a communication system supporting a NOMA scheme.

An embodiment of the present disclosure provides an apparatus and method for transmitting and receiving data by considering a distance between a BS and an STA in a communication system supporting a NOMA scheme.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a 3rdgeneration project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

A method of transmitting and receiving data among a BS and STAs in a communication system supporting a NOMA scheme to which an embodiment of the present disclosure is applied may be described with reference to FIG. 1.

FIG. 1 illustrates an example of a communication system supporting a NOMA scheme according to an embodiment of the present disclosure.

Referring to FIG. 1, it may be assumed that there are two STAs in a communication system supporting a NOMA scheme. However, an embodiment of the present disclosure may be applied to all cases that there is at least one STA in a communication system supporting a NOMA scheme.

In FIG. 1, a communication system supporting a NOMA scheme includes a BS 110 and at least one STA performing a communication with the BS 110. In FIG. 1, it may be assumed that the at least one STA performing the communication with the BS 110 includes two STAs, e.g., an STA 1 130 and an STA 2 150. However, an embodiment of the present disclosure may be applied to all communication systems including at least two STAs.

In FIG. 1, it may be assumed that the STA 1 130 and the STA 2 150 are included in one of a plurality of groups which perform a communication with the BS 110, the STA 1 130 is located within a predetermined distance, and the STA 2 150 is located outside the predetermined distance.

In FIG. 1, (a) indicates that the BS 110 transmits data to each of the STA 1 130 and the STA 2 150 included in one group. The data transmitted to each of the STA 1 130 and the STA 2 150 is the same, and includes all of the first data for transmission to the STA 1 130 and the second data for transmission to the STA 2 150.

In FIG. 1, (b) indicates that each of the STA 1 130 and the STA 2 150 transmits an acknowledgement (ACK) signal for data which corresponds to each of the STA 1 130 and the STA 2 150 to the BS 110.

For this, the BS 110 needs to include information for identifying the STA 1 130 and the STA 2 150 into data to transmit the data to each of the STA 1 130 and the STA 2 150 upon transmitting the data to each of the STA 1 130 and the STA 2 150. Each of the STA 1 130 and the STA 2 150 decodes the data and needs to transmit an ACK signal for the decoded data to the BS 110. A method of transmitting and receiving data among the BS 110, the STA 1 130 and the STA 2 150 may be described with reference to FIG. 5, and a detailed description thereof may be omitted herein.

In an embodiment of the present disclosure, each of the BS 119, the STA 1 130 and the STA 2 150 transmits and receives data based on a TDD scheme used for transmitting and receiving data in an LTE communication system for increasing a possibility to be applied to a communication system. Here, a table for a schedule according to which data is transmitted and received in the TDD scheme may be pre-defined, and may be described with reference to FIGS. 2 to 4.

FIGS. 2 to 4 illustrate tables for a schedule based on which data is transmitted and received in a TDD scheme to which an embodiment of the present disclosure is applied.

A table for an uplink/downlink schedule per configuration in an LTE TDD scheme according to an embodiment of the present disclosure may be described with reference to FIG. 2.

FIG. 2 illustrates a table for an uplink and downlink schedule per configuration in an LTE TDD scheme according to an embodiment of the present disclosure.

Referring to FIG. 2, it will be noted that a table for a uplink/downlink schedule per configuration in FIG. 2 is a table for an uplink/downlink schedule per configuration which corresponds to Table 4.2-2 defined in Release 12 of evolved universal terrestrial radio access (E-UTRA) Physical Channels and Modulation of 3GPP TS 36.211. Definition of a table for a uplink/downlink schedule per configuration in FIG. 2 is the same as definition of Table 4.2-2 defined in Release 12 of E-UTRA Physical Channels and Modulation of 3GPP TS 36.211, so a detailed description thereof will be omitted herein.

The A table for an uplink and/or/downlink schedule per configuration in an LTE TDD scheme according to an embodiment of the present disclosure has been described with reference to FIG. 2, and a table for an uplink hybrid automatic retransmit request (HARQ) schedule in an LTE TDD scheme according to an embodiment of the present disclosure willmay be described with reference to FIG. 3.

FIG. 3 illustrates a table for an uplink HARQ schedule in an LTE TDD scheme according to an embodiment of the present disclosure.

Referring to FIG. 3, it will be noted that a table for a uplink HARQ schedule in FIG. 3 is a table for a uplink HARQ schedule which corresponds to Table 10.1.3.1-1 defined in Release 12 of E-UTRA Physical Layer Procedures of 3GPP TS 36.213. Definition of a table about for uplink HARQ schedule in FIG. 3 is the same as definition of Table 10.1.3.1-1 defined in Release 12 of E-UTRA Physical Layer Procedures of 3GPP TS 36.213, so a detailed description thereof will be omitted herein.

TheA table for an uplink HARQ schedule in an LTE TDD scheme according to an embodiment of the present disclosure has been described with reference to FIG. 3, and thea table for a downlink HARQ schedule in an LTE TDD scheme according to an embodiment of the present disclosure is described with reference to FIG. 4.

FIG. 4 illustrates a table for a downlink HARQ schedule in an LTE TDD scheme according to an embodiment of the present disclosure.

Referring to FIG. 4, it will be noted that a table for a downlink HARQ schedule in FIG. 4 is a table for a downlink HARQ schedule which corresponds to Table 9.1.2-1 defined in Release 12 of E-UTRA Physical Layer Procedures of 3GPP TS 36.213. Definition of a table for a downlink HARQ schedule in FIG. 4 is the same as definition of Table 9.1.2-1 defined in Release 12 of E-UTRA Physical Layer Procedures of 3GPP TS 36.213, so a detailed description thereof will be omitted herein.

As described in FIG. 2, an LTE TDD scheme may support asymmetric uplink and/or downlink allocation by providing seven different uplink and/or downlink configurations which are configured semi-statically. Further, FIG. 2 shows seven uplink/downlink configurations used in an LTE scheme, "D" indicates a downlink subframe, "S" indicates a special subframe, e.g., a subframe which may support a downlink and an uplink, and "U" indicates an uplink subframe. For example, an uplink/downlink configuration 0 may include six uplink subframes, e.g., subframes 2, 3, 4, 7, 8, and 9 and downlink and special subframes, e.g., 0, 1, 5, and 6. For another example, an uplink/downlink configuration 1 may include four uplink subframes, e.g., subframes 2, 3, 7, and 8 and downlink and special subframes, e.g., 0, 1, 4-6, and 9.

Further, transmission of an ACK signal for data transmitted in a downlink may be performed according to HARQ schedule time for an uplink as shown in FIG. 3. For example, in an uplink/downlink configuration 0, an ACK signal transmitted on a subframe 2 through an uplink is an ACK signal for downlink data received before 7 subframes and 6 subframes. Further, a data retransmitting process according to an ACK signal received in a downlink may be performed according to HARQ schedule time for a downlink as shown in FIG. 4. For example, in an uplink and/or downlink configuration 1, retransmission of data which corresponds to an ACK signal received in a subframe 2 is performed after 4 subframes.

A communication system supporting a NOMA scheme and a scheduling method based on a TDD scheme which are applied to an embodiment of the present disclosure have been described above, and a scheme of transmitting and receiving data according to a schedule table based on a TDD scheme in a communication system supporting a NOMA scheme may be described with reference to FIGS. 5 to 9.

An example of a process of transmitting and receiving data in a BS in a communication system supporting a NOMA scheme according to an embodiment of the present disclosure may be described with reference to FIG. 5.

Figure 5:
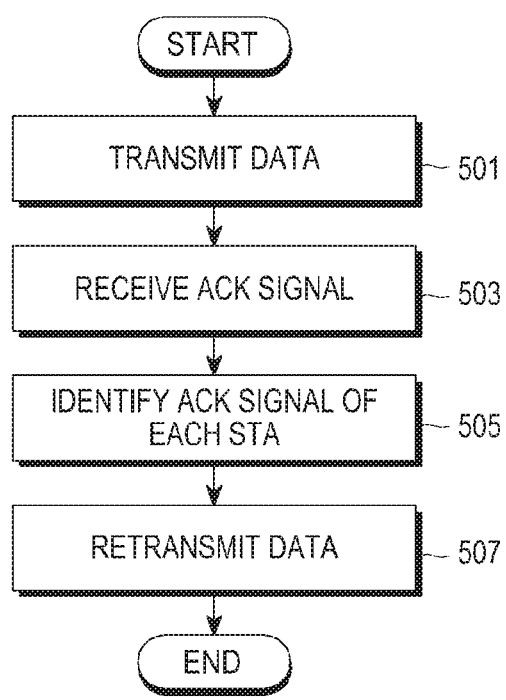
FIG. 5 illustrates an example of a process of transmitting and receiving data in a BS in a communication system supporting a non-orthogonal multiple access (NOMA) scheme according to an embodiment of the present disclosure.

FIG. 5 illustrates an example of a process of transmitting and receiving data in a BS in a communication system supporting a NOMA scheme according to an embodiment of the present disclosure.

Referring to FIG. 5, a BS 110 transmits the same data to at least one STA according to a downlink schedule in each configuration in a table for an uplink and/or downlink schedule per configuration in FIG. 2 at step 501. For example, as shown in FIGS. 6 and 7, the BS 110 may transmit data to at least one STA based on a configuration 1 in the table for the uplink/downlink schedule per configuration in FIG. 2.

An example of a process of transmitting data in a BS in a communication system supporting a NOMA scheme according to an embodiment of the present disclosure may be described with reference to FIGS. 6 and 7.

Figure 6:
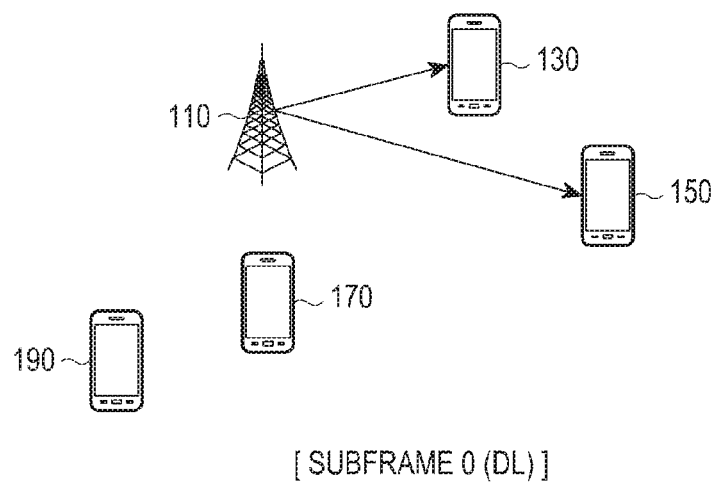
FIG. 6 illustrates an example of a process of transmitting data in a BS in a communication system according to an embodiment of the present disclosure.
Figure 6:
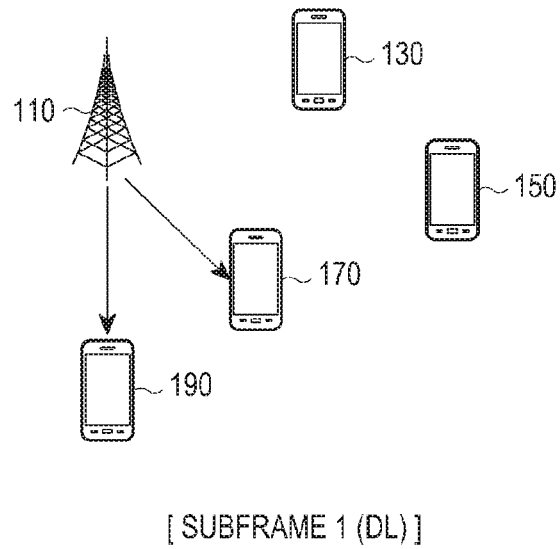
Figures 7, 8:
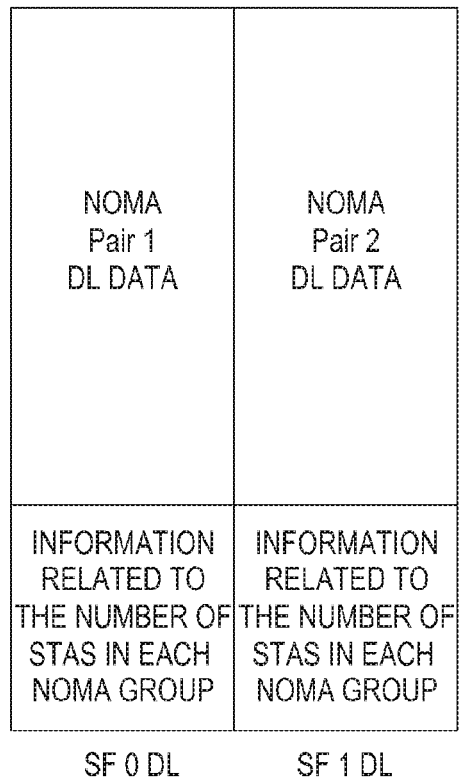
FIG. 7 illustrates another example of a process of transmitting data in a base station (BS) in a communication system according to an embodiment of the present disclosure.
FIG. 8 illustrates an example of a process of performing a data transmitting operation and a data retransmitting operation in a BS in a communication system supporting a NOMA scheme according to an embodiment of the present disclosure.

FIGS. 6 and 7 illustrate an example of a process of transmitting data in a BS in a communication system according to an embodiment of the present disclosure.

Referring to FIG. 6, a BS 110 may identify pairs of STAs included in a predefined range, e.g., one group and support different pairs during different downlink schedule intervals. At this time, the BS 110 may minimize impact due to interference by supporting pairs of which channel correlations are different for downlink subframes.

In FIG. 6, for example, if the BS 110 transmits data using a downlink configuration 1, the BS 110 may transmit data to an STA 1 130 and an STA 2 150 on a subframe 0, and may transmit data to an STA 3 170 and an STA 4 190 on a subframe 1. At this time, the BS 110 includes information related to the number of STAs included in each group and TDD configuration information into data to transmit the data to STAs included in a group upon transmitting initial data as shown in FIG. 7.

The information related to the number of STAs included in each group is used for each STA to determine a frequency through which an ACK signal is transmitted. That is, in FIG. 6, if the BS 110 transmits data using a downlink configuration 1, the BS 110 may transmit data for a pair 1 and information related to the number of STAs included in each group to the STA 1 130 and the STA 2 150 on the subframe 0, and transmit data for a pair 2 and information related to the number of STAs included in each group to the STA 3 170 and the STA 4 190 on the subframe 1.

Referring to FIG. 5, the BS 110 receives an ACK signal for received data from each of STAs at step 503. The BS 110 acquires an ACK signal transmitted by the STA 1 130 and an ACK signal transmitted by the STA 2 150 from the received ACK signals at step 505.

The BS 110 performs a data transmitting operation or a data retransmitting operation according to the acquired ACK signal at step 507. For example, the BS 110 may perform a data transmitting operation or a data retransmitting operation based on an ACK signal per STA, this may be described with reference to FIG. 8, and a detailed description thereof may be omitted herein.

Although FIG. 5 illustrates an example of a process of transmitting and receiving data in a BS in a communication system supporting a NOMA scheme according to an embodiment of the present disclosure, various changes could be made to FIG. 5. For example, although shown as a series of operations, various operations in FIG. 5 could overlap, occur in parallel, occur in a different order, or occur multiple times.

An example of a process of performing a data transmitting operation and a data retransmitting operation in a BS in a communication system supporting a NOMA scheme according to an embodiment of the present disclosure may be described with reference to FIG. 8.

FIG. 8 illustrates an example of a process of performing a data transmitting operation and a data retransmitting operation in a BS in a communication system supporting a NOMA scheme according to an embodiment of the present disclosure.

Referring to FIG. 8, if all of an ACK signal received from an STA 1 130 and an ACK signal received from an STA 2 150 include positive ACK information, a BS 110 transmits the next data based on a schedule scheme in an existing TDD scheme. If all of the ACK signal received from the STA 1 130 and the ACK signal received from the STA 2 150 include negative ACK information, the BS 110 transmits data based on the schedule scheme in the existing TDD scheme.

If the ACK signal received from the STA 1 130 includes negative ACK information, and the ACK signal received from the STA 2 150 includes positive ACK information, the BS 110 may retransmit data according to request of the STA 1 130.

If the ACK signal received from the STA 1 130 includes positive ACK information, and the ACK signal received from the STA 2 150 includes negative ACK information, the BS 110 retransmits data to the STA 2 150 based on the schedule scheme in the existing TDD scheme. At this time, the STA 1 130 may retransmit data to the STA 2 150 identical to the data transmitted from the BS 110 to the STA 2 150, i.e., data received by the STA 1 130 from the BS 110. A process of retransmitting data in the BS 110 may be described with reference to FIG. 9, and a detailed description thereof may be omitted herein.

An example of a process of performing a data transmitting operation and a data retransmitting operation in a BS in a communication system supporting a NOMA scheme according to an embodiment of the present disclosure has been described with reference to FIG. 8, and another example of a process of retransmitting data in a BS in a communication system supporting a NOMA scheme according to an embodiment of the present disclosure may be described with reference to FIG. 9.

Figure 9:
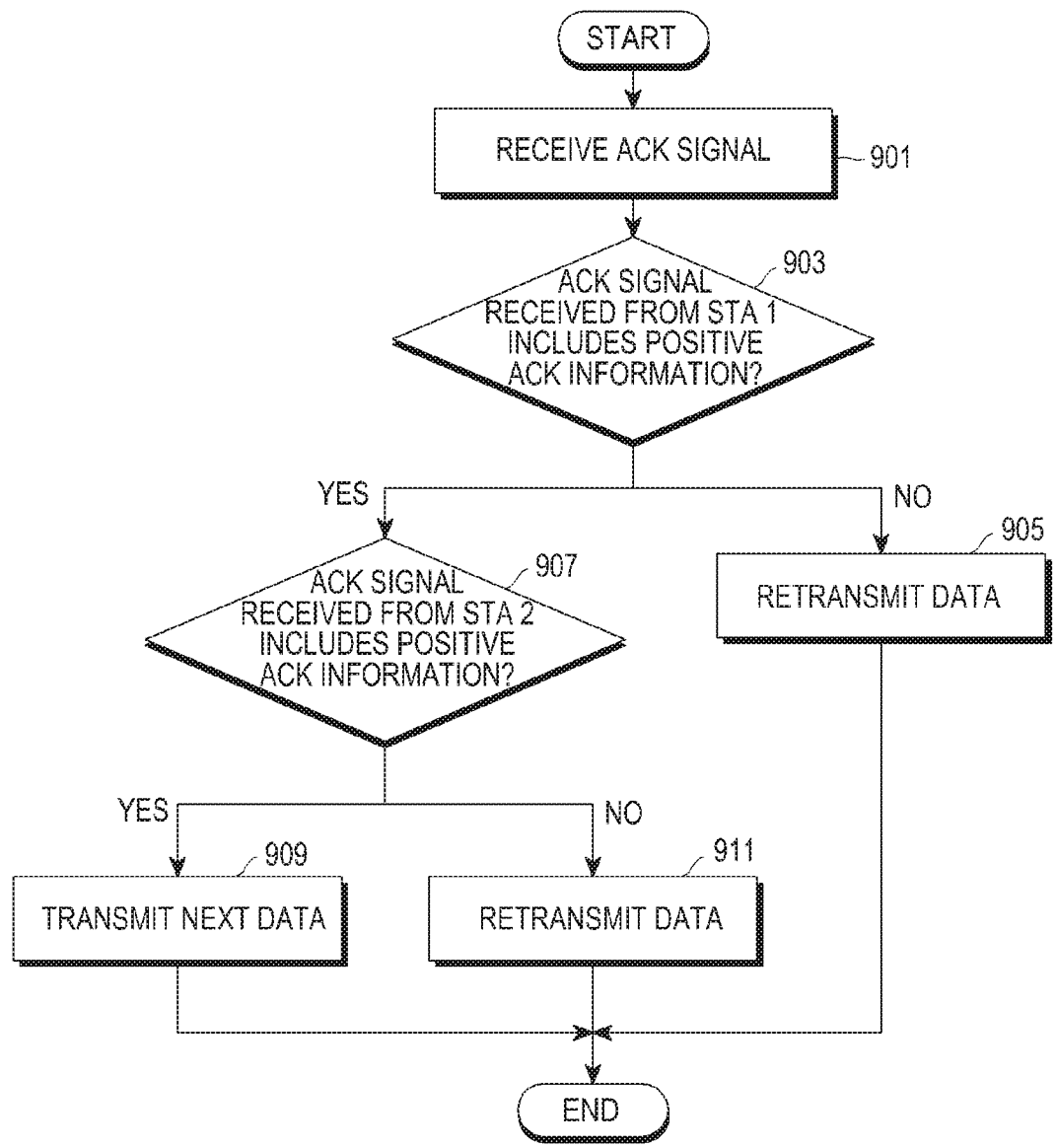
FIG. 9 illustrates another example of a process of retransmitting data in a BS in a communication system supporting a NOMA scheme according to an embodiment of the present disclosure.

FIG. 9 illustrates another example of a process of retransmitting data in a BS in a communication system supporting a NOMA scheme according to an embodiment of the present disclosure.

Referring to FIG. 9, it may be noted that a process of retransmitting data in a BS in FIG. 9 is a process of retransmitting data in a BS in a case that a BS 110 receives an ACK signal from each of an STA 130 and an STA 150 and retransmits data based on the received ACK signals as described in steps 503 to 507 in FIG. 5.

Referring to FIG. 9, a BS 110 receives an ACK signal from each of an STA 1 130 and an STA 150 at step 901. The BS 110 determines whether the ACK signal received from the STA 1 130 includes positive ACK information at step 903. If the ACK signal received from the STA 1 130 does not include the positive ACK information, that is, if the ACK signal received from the STA 1 130 includes negative ACK information, the BS 110 retransmits data transmitted previously on the next downlink subframe at step 905.

If the ACK signal received from the STA 1 130 includes the positive ACK information, the BS determines whether the ACK signal received from the STA 2 150 includes positive ACK information at step 907. If the ACK signal received from the STA 2 150 includes the positive ACK information, the BS 110 transmits the next data on a downlink subframe of the next radio subframe at step 909.

If the ACK signal received from the STA 2 150 does not include the positive ACK information, that is, if the ACK signal received from the STA 2 150 includes negative ACK information, the BS 110 retransmits data transmitted previously on the next downlink subframe at step 911.

Although FIG. 9 illustrates another example of a process of retransmitting data in a BS in a communication system supporting a NOMA scheme according to an embodiment of the present disclosure, various changes could be made to FIG. 9. For example, although shown as a series of operations, various operations in FIG. 9 could overlap, occur in parallel, occur in a different order, or occur multiple times.

A scheme of transmitting and receiving data in a BS in a communication system supporting a NOMA scheme has been described with reference to FIGS. 5 to 9, and a scheme of transmitting and receiving data in an STA in a communication system supporting a NOMA scheme may be described with reference to FIGS. 10 to 13.

Figure 10:
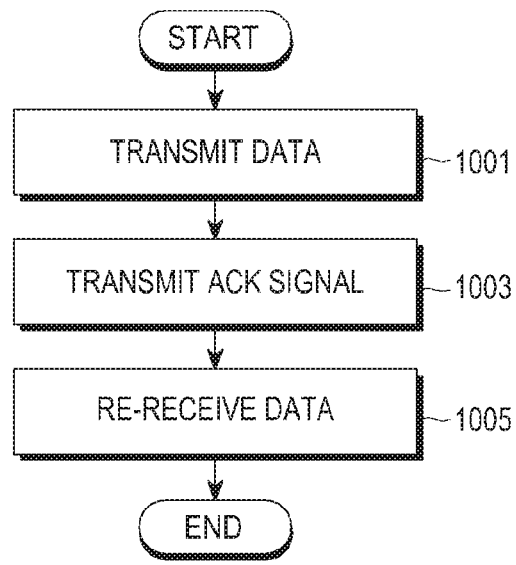
FIG. 10 illustrates an example of a process of transmitting and receiving data in station (STA) in a communication system supporting a NOMA scheme according to an embodiment of the present disclosure.

FIG. 10 illustrates an example of a process of transmitting and receiving data in an STA in a communication system supporting a NOMA scheme according to an embodiment of the present disclosure.

Referring to FIG. 10, an STA receives data from a BS 110 at step 1001. At this time, the data includes data which the BS 110 intends to transmit to the STA and information related to the number of STAs included in each group. The STA decodes the data received from the BS 110, cancels data which corresponds to other STAs from the decoded data, and transmits an ACK signal for data which corresponds to the STA to the BS 110 at step 1003. When the STA transmits the ACK signal to the BS 110, at least one of other STAs included in a group in which the STA is included transmits an ACK signal to the BS 110. So, each STA uses information related to the number of STAs in each group received from the BS 110 thereby the BS 110 may identify an ACK signal transmitted by each STA. That is, location of a frequency resource through an uplink ACK signal of the STA is transmitted is allocated to the STA with a sequential stack structure based on information related to the number of STAs included in other group received from the BS 110. For example, when receiving information indicating that the number of STAs included in other group is n, the STA transmits an ACK signal using an (n+1)th frequency resource.

If the STA transmits an ACK signal including negative ACK information, the STA may receive data again from the BS 110 and at least one of other STAs at step 1005. If the STA is an STA 2 150, that is, if the STA is located outside a preset distance from the BS 110, the STA 2 150 may transmit an ACK signal to at least one of the BS 110 and an STA 1 130.

Although FIG. 10 illustrates an example of a process of transmitting and receiving data in an STA in a communication system supporting a NOMA scheme according to an embodiment of the present disclosure, various changes could be made to FIG. 10. For example, although shown as a series of operations, various operations in FIG. 10 could overlap, occur in parallel, occur in a different order, or occur multiple times.

An example of a process of transmitting and receiving data in an STA in a communication system supporting a NOMA scheme according to an embodiment of the present disclosure has been described with reference to FIG. 10, and an example of a process of transmitting an ACK signal for data in an STA in a communication system supporting a NOMA scheme according to an embodiment of the present disclosure may be described with reference to FIG. 11.

Figure 11:
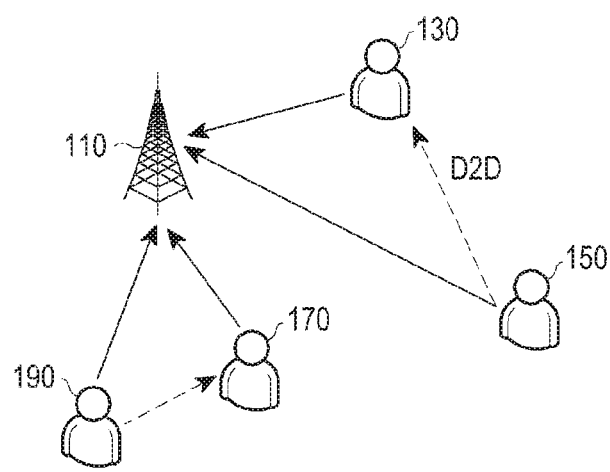
FIG. 11 illustrates an example of a process of transmitting an acknowledgement (ACK) signal for data in an STA in a communication system supporting a NOMA scheme according to an embodiment of the present disclosure.

FIG. 11 illustrates an example of a process of transmitting an ACK signal for data in an STA in a communication system supporting a NOMA scheme according to an embodiment of the present disclosure.

Referring to FIG. 11, it may be noted that a process of transmitting an ACK signal for data in an STA in FIG. 11 is a process of transmitting an ACK signal for data in an STA in a case that an STA 2 150 and a BS 110 perform a data transmitting and receiving operation based on an uplink/downlink configuration 1 used in a TDD scheme.

In FIG. 11, the STA 2 150 may transmit an ACK signal to an STA 1 130 based on a device to device (D2D) communication while transmitting an ACK signal to the BS 110 on a subframe 7 corresponding to an uplink and/or downlink configuration 1.

The STA 1 130 may transmit, to the STA 150, data received from the BS 110, this may be described with reference to FIG. 12, and a detailed description thereof may be omitted herein.

An example of a process of transmitting an ACK signal for data in an STA in a communication system supporting a NOMA scheme according to an embodiment of the present disclosure has been described with reference to FIG. 11, and an example of a process of transmitting data received from a BS to another STA in an STA in a communication system supporting a NOMA scheme according to an embodiment of the present disclosure may be described with reference to FIG. 12.

Figure 12:
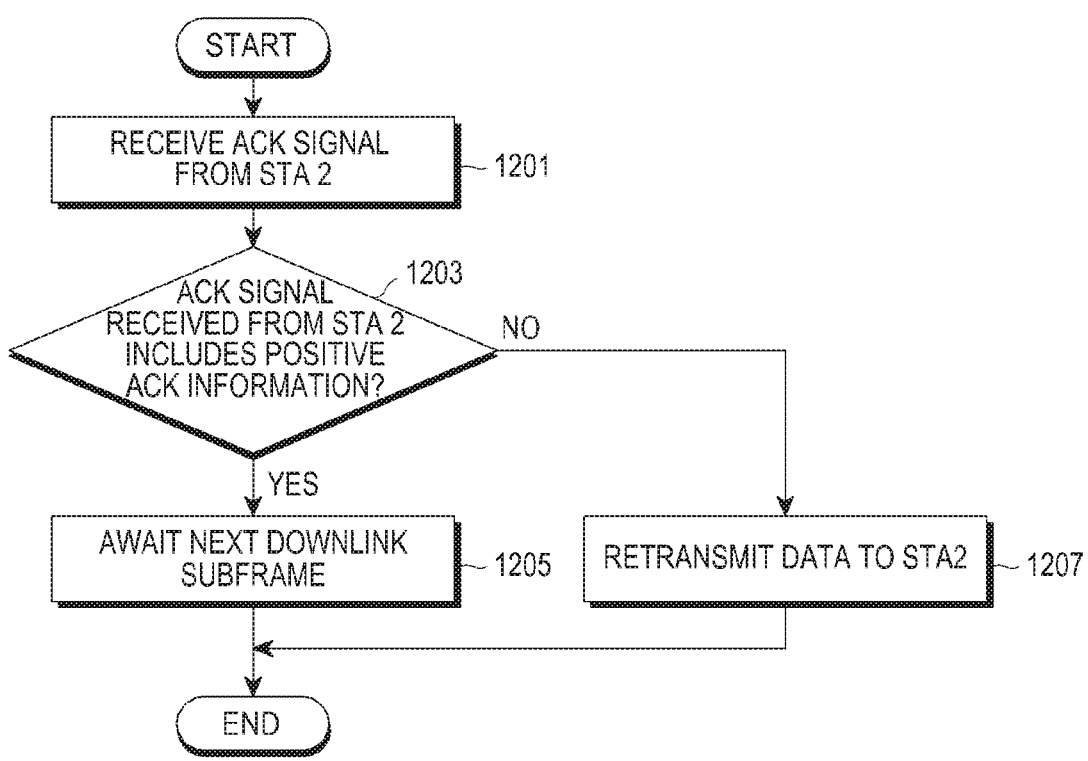
FIG. 12 illustrates an example of a process of transmitting data received from a BS to another STA in an STA in a communication system supporting a NOMA scheme according to an embodiment of the present disclosure.

FIG. 12 illustrates an example of a process of transmitting data received from a BS to another STA in an STA in a communication system supporting a NOMA scheme according to an embodiment of the present disclosure.

Referring to FIG. 12, in a process of transmitting an ACK signal for data in an STA in FIG. 12, it may be noted that the STA, i.e., an STA 1 130 transmits an ACK signal including positive ACK information to a BS 110, and is located within a preset distance from the BS 110.

In FIG. 12, the STA 1 130 receives an ACK signal from an STA 150 at step 1201. The STA 1 130 determines whether the ACK signal received from the STA 150 includes positive ACK information at step 1203. If the ACK signal received from the STA 150 includes the positive ACK information, the STA 1 130 awaits the next downlink subframe without performing a data retransmitting operation at step 1205.

If the ACK signal received from the STA 150 does not include the positive ACK information, that is, the ACK signal received from the STA 150 includes negative ACK information, the STA 1 130 transmits, to the STA 2 150, data received from a BS 110.

Although FIG. 12 illustrates an example of a process of transmitting data received from a BS to another STA in an STA in a communication system supporting a NOMA scheme according to an embodiment of the present disclosure, various changes could be made to FIG. 12. For example, although shown as a series of operations, various operations in FIG. 12 could overlap, occur in parallel, occur in a different order, or occur multiple times.

An example of a process of transmitting data received from a BS to another STA in an STA in a communication system supporting a NOMA scheme according to an embodiment of the present disclosure has been described with reference to FIG. 12, and an example of a data retransmitting process in a cast that an STA transmits an ACK signal to another STA and a BS in a communication system supporting a NOMA scheme according to an embodiment of the present disclosure may be described with reference to FIG. 13.

Figure 13:
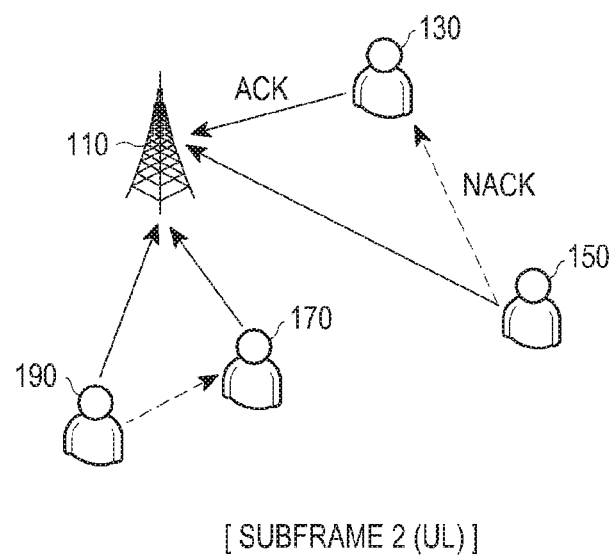
FIG. 13 illustrates an example of a data retransmitting process in a cast that an STA transmits an ACK signal to another STA and a BS in a communication system supporting a NOMA scheme according to an embodiment of the present disclosure.
Figure 13:
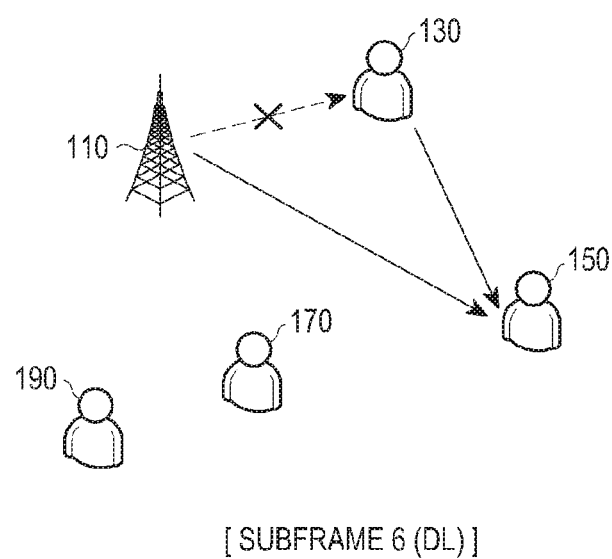

FIG. 13 illustrates an example of a data retransmitting process in a cast that an STA transmits an ACK signal to another STA and a BS in a communication system supporting a NOMA scheme according to an embodiment of the present disclosure.

Referring to FIG. 13, each of a plurality of STAs transmits an ACK signal to a BS 110 on an uplink subframe 2 based on an uplink/downlink configuration 1 used in a TDD scheme. At this time, an STA 2 150 and an STA 4 190 may transmit an ACK signal to each of STAs located within a preset distance from the BS 110 among STAs included in each group, i.e., an STA 1 130 and an STA 3 150.

If the STA 1 130 transmits an ACK signal including positive ACK information to the BS 110 and the STA 2 150 transmits an ACK signal including negative ACK information to the BS 110 and the STA 1 130, the BS 110 and the STA 1 130 may transmit data to the STA 2 150 on a downlink subframe 6. That is, the BS 110 retransmits data to the STA 2 150, and the STA 1 130 transmits data to the STA 2 150.

So, if there is a need for data retransmission for the STA 2 150, that is, if an ACK signal transmitted by the STA 2 150 includes negative ACK information, the STA 2 150 may receive data again from all of the BS 110 and the STA 1 130.

According to an embodiment of the present disclosure, if the STA 2 150 does not receive initial data, the STA 2 150 may receive the initial data from all of the BS 110 and the STA 1 130, so a data receiving probability may be increased.

Further, the STA 1 130 may reuse data of the STA 2 150 decoded previously, so effective successive interference cancellation (SIC) scheme may be operated.

A method of transmitting and receiving data in a BS 110 and STAs 130 and 150 in a communication system supporting a NOMA scheme according to an embodiment of the present disclosure has been described with reference to FIGS. 5 to 13, and an inner structure of a BS transmitting and receiving data in a communication system supporting a NOMA scheme according to an embodiment of the present disclosure may be described with reference to FIG. 14.

Figure 14:
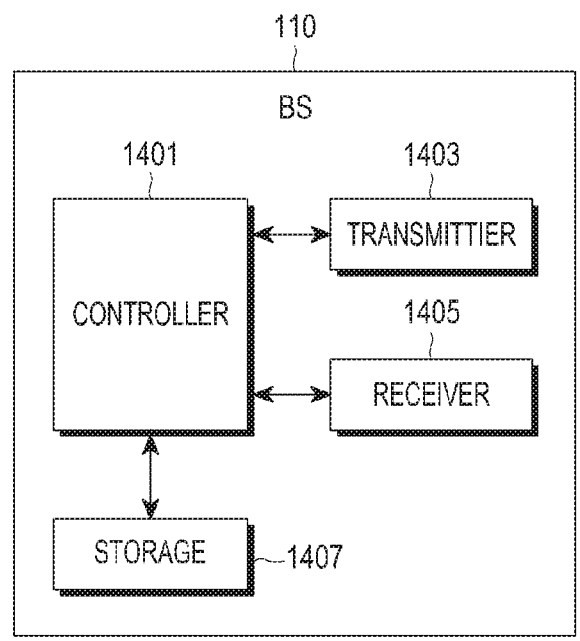
FIG. 14 illustrates an inner structure of a BS transmitting and receiving data in a communication system supporting a NOMA scheme according to an embodiment of the present disclosure.

FIG. 14 illustrates an inner structure of a BS transmitting and receiving data in a communication system supporting a NOMA scheme according to an embodiment of the present disclosure.

Referring to FIG. 14, a BS 110 includes a controller 1401, a transmitter 1403, a receiver 1405, and a storage 1407.

The controller 1401 controls the overall operation of the BS 110. More particularly, the controller 1401 controls an operation related to an operation of transmitting and receiving data in a communication system supporting a NOMA scheme according to embodiments of the present disclosure. The operation related to the operation of transmitting and receiving the data in the communication system supporting the NOMA scheme according to embodiments of the present disclosure has been described with FIGS. 1 to 13, and a detailed description thereof may be omitted herein.

The transmitter 1403 transmits various signals and various messages to other entities, e.g., another BS and an STA, and/or the like in the communication system supporting the NOMA scheme under a control of the controller 1401. The various signals and various messages transmitted in the transmitter 1403 have been described with reference to FIGS. 1 to 13, and a detailed description thereof may be omitted herein.

The receiver 1405 receives various signals and various messages from other entities, e.g., another BS and an STA, and/or the like in the communication system supporting the NOMA scheme under a control of the controller 1401. The various signals and various messages received in the receiver 1405 have been described with reference to FIGS. 1 to 13, and a detailed description thereof may be omitted herein.

The storage 1407 stores various programs, various data, and/or the like related to an operation related to an operation of transmitting and receiving data in a communication system supporting a NOMA scheme according to embodiments of the present disclosure, performed in the BS 110 under a control of the controller 1401. The storage 1407 stores various signals and various messages which are received by the receiver 1405 from the other entities.

While the controller 1401, the transmitter 1403, the receiver 1405, and the storage 1407 are described in the BS 110 as separate storages, it is to be understood that this is merely for convenience of description. In other words, two or more of the controller 1401, the transmitter 1403, the receiver 1405, and the storage 1407 may be incorporated into a single circuit.

The BS 110 may be implemented with at least one processor.

An inner structure of a BS transmitting and receiving data in a communication system supporting a NOMA scheme according to an embodiment of the present disclosure has been described with reference to FIG. 14, and an inner structure of an STA transmitting and receiving data in a communication system supporting a NOMA scheme according to an embodiment of the present disclosure may be described with reference to FIG. 15.

Figure 15:
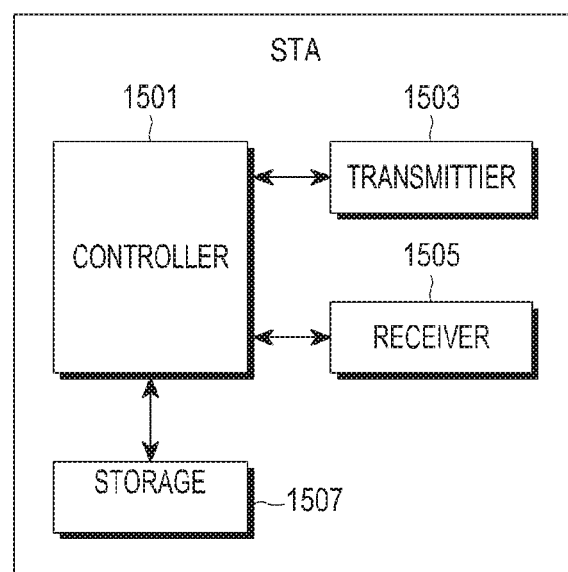
FIG. 15 illustrates an inner structure of an STA transmitting and receiving data in a communication system supporting a NOMA scheme according to an embodiment of the present disclosure.

FIG. 15 illustrates an inner structure of an STA transmitting and receiving data in a communication system supporting a NOMA scheme according to an embodiment of the present disclosure.

Referring to FIG. 15, it may be noted that an inner structure of an STA in FIG. 15 corresponds to an inner structure of one of an STA 1 130 and an STA 2 150.

An STA includes a controller 1501, a transmitter 1503, a receiver 1505, and a storage 1507.

The controller 1501 controls the overall operation of the STA. More particularly, the controller 1501 controls an operation related to an operation of transmitting and receiving data in a communication system supporting a NOMA scheme according to embodiments of the present disclosure. The operation related to the operation of transmitting and receiving the data in the communication system supporting the NOMA scheme according to embodiments of the present disclosure has been described with FIGS. 1 to 13, and a detailed description thereof may be omitted herein.

The transmitter 1503 transmits various signals and various messages to other entities, e.g., a BS and another STA, and/or the like in the communication system supporting the NOMA scheme under a control of the controller 1501. The various signals and various messages transmitted in the transmitter 1503 have been described with reference to FIGS. 1 to 13, and a detailed description thereof may be omitted herein.

The receiver 1505 receives various signals and various messages from other entities in the communication system supporting the NOMA scheme under a control of the controller 1501. The various signals and various messages received in the receiver 1505 have been described with reference to FIGS. 1 to 13, and a detailed description thereof may be omitted herein.

The storage 1507 stores various programs, various data, and/or the like related to an operation related to an operation of transmitting and receiving data in a communication system supporting a NOMA scheme according to embodiments of the present disclosure, performed in the STA under a control of the controller 1501. The storage 1507 stores various signals and various messages which are received by the receiver 1505 from the other entities.

While the controller 1501, the transmitter 1503, the receiver 1505, and the storage 1507 are described in the STA as separate storages, it is to be understood that this is merely for convenience of description. In other words, two or more of the controller 1501, the transmitter 1503, the receiver 1505, and the storage 1507 may be incorporated into a single circuit.

The STA may be implemented with at least one processor.

An inner structure of an STA transmitting and receiving data in a communication system supporting a NOMA scheme according to an embodiment of the present disclosure has been described with reference to FIG. 15, and an example of a process of transmitting and receiving data based on a TDD scheme in a communication system supporting a NOMA scheme according to an embodiment of the present disclosure may be described with reference to FIG. 16.

Figure 16:
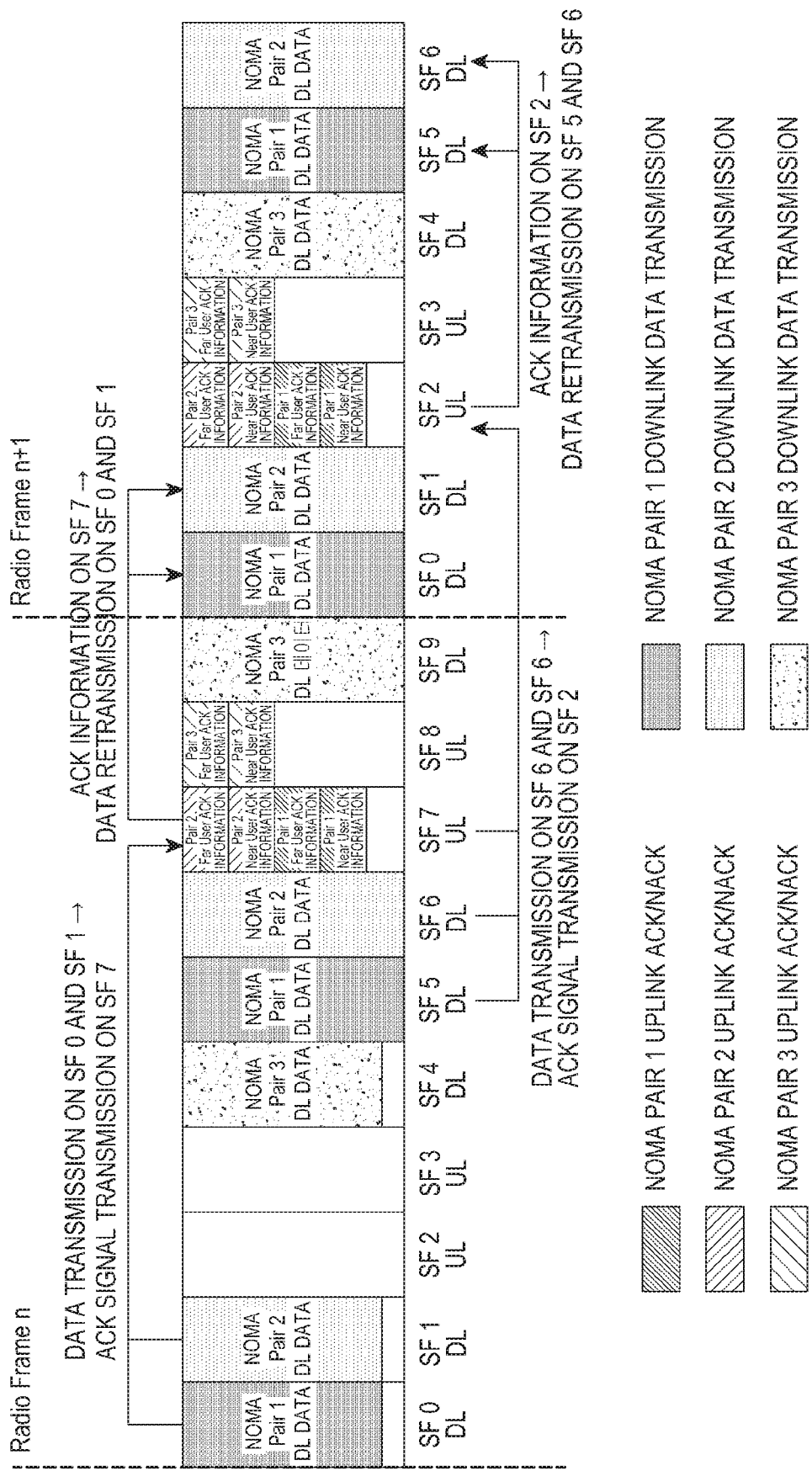
FIG. 16 illustrates an example of a process of transmitting and receiving data based on a TDD scheme in a communication system supporting a NOMA scheme according to an embodiment of the present disclosure.

FIG. 16 illustrates an example of a process of transmitting and receiving data based on a TDD scheme in a communication system supporting a NOMA scheme according to an embodiment of the present disclosure.

Referring to FIG. 16, it may be noted that a process of transmitting and receiving data based on a TDD scheme is a process of transmitting and receiving data based on an uplink and/or downlink configuration 1.

In FIG. 16, a BS 110 transmits data for a pair 1 to STAs included in the pair 1 on a subframe 0 of the nth radio frame, and transmits data for pair 2 to STAs included in the pair 2 on a subframe 1.

The BS 110 may transmit data for a pair 3 to STAs included in the pair 3 on a subframe 4. The BS 110 may transmit the next data for the pair 1 to the STAs included in the pair 1 on a subframe 5, and transmit the next data for the pair 2 to the STAs included in the pair 2 on a subframe 6.

Meanwhile, an ACK signal for data transmitted on a subframe 0 and a subframe 1 according to a schedule table in FIGS. 2 and 3 may be transmitted on a subframe 7, so each STA transmits an ACK signal for data transmitted on a subframe 0 and a subframe 1 to a BS 110 on a subframe 7 through a resource allocated differently for each STA based on information related to the number of STAs included in each group. At this time, if an STA 2 150 included in the pair 1 transmits an ACK signal including negative ACK information, the BS 110 may retransmit data transmitted previously on a subframe 0 of the nth radio frame.

Further, data transmission and reception among a BS and STAs on other subframe which is based on a schedule table of a TDD scheme in FIGS. 2 and 3 may be understood based on the description in FIG. 14, so a detailed description thereof may be omitted herein.

An example of a process of transmitting and receiving data based on a TDD scheme in a communication system supporting a NOMA scheme according to an embodiment of the present disclosure has been described with reference to FIG. 16, and a data transmitting and/or receiving process according to an embodiment of the present disclosure and a general data transmitting/receiving process in a communication system supporting a NOMA scheme may be described with reference to FIG. 17.

Figure 17:
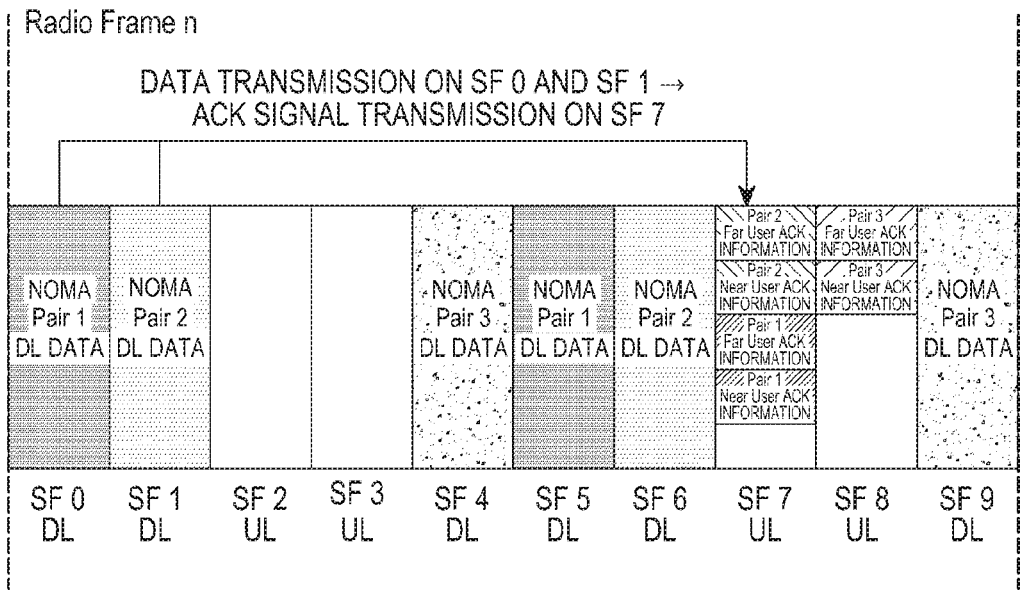
FIG. 17 illustrates a data transmitting and receiving process, and a general data transmitting and receiving process in a communication system supporting a NOMA scheme according to an embodiment of the present disclosure.
Figure 17:
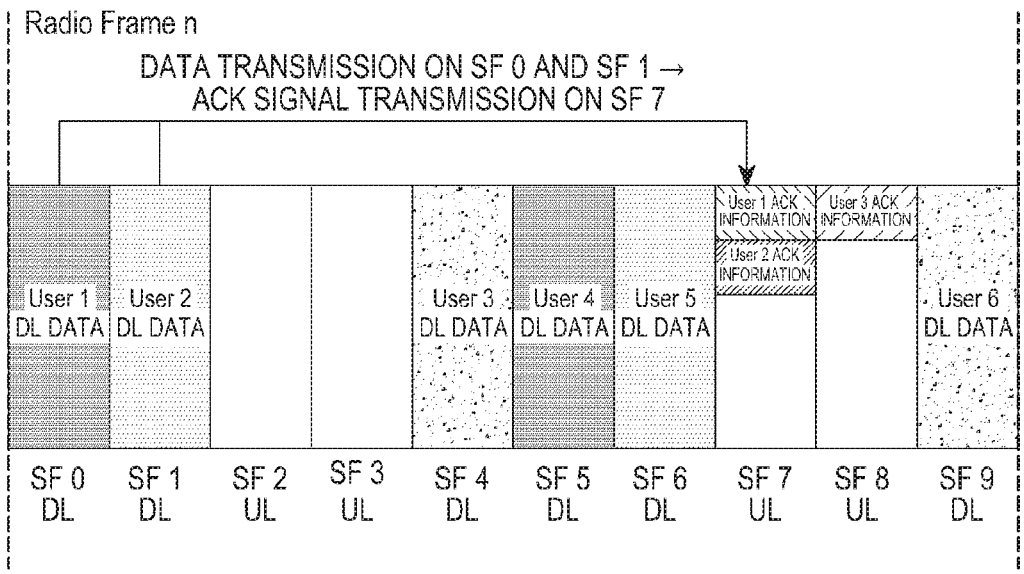

FIG. 17 illustrates a data transmitting and/or receiving process according to an embodiment of the present disclosure and a general data transmitting/receiving process in a communication system supporting a NOMA scheme.

Referring to FIG. 17, an example (a) of a data transmitting and/or receiving process, and an example (b) of a general data transmitting and/or receiving process according to an embodiment of the present disclosure are shown in FIG. 17.

As shown in (a), a BS 110 may transmit data for a pair 1 to STAs included in the pair 1, e.g., an STA 1 130 and an STA 2 150 on a subframe 0, and may transmit data for a pair 2 to STAs included in the pair 2, e.g., an STA 3 170 and an STA 4 190 on a subframe 1.

However, as shown in (b), the BS 110 transmits data for an STA to the STA on a subframe 0, and transmits data for another STA different from the STA to another STA on a subframe 1.

That is, if a data transmitting and/or receiving process according to an embodiment of the present disclosure is used, the BS 110 may transmit data to a plurality of STAs on one subframe. However, if a general data transmitting and/or receiving process is used, the BS 110 may transmit data to one STA on one subframe.

That is, if a data transmitting and/or receiving process according to an embodiment of the present disclosure is applied to a communication system supporting a NOMA scheme, subframes included in a radio frame may be effectively used.

In accordance with various embodiments of the present disclosure, a method for receiving data in a station (STA) in a communication system is provided. The method includes receiving, from a base station (BS), data transmitted on a group basis through a first sub-frame based on a schedule preset based on a time division duplexing (TDD) scheme; and transmitting, to the BS, an acknowledgement (ACK) signal based on the received data on a second sub-frame after a first interval from the first sub-frame.

Preferably, the data includes data requested by each of a plurality of STAs included in a group, information related to a number of STAs included in each group, and information related to a configuration used when the data is transmitted in the TDD scheme.

Preferably, the method further comprises allocating a resource for transmitting the ACK signal based on the number of STAs included in each group on the second sub-frame after the first interval from the first sub-frame based on the schedule preset based on the TDD scheme.

Preferably, the method further comprises receiving, from the BS, the data again through a third sub-frame after a second interval from the first sub-frame based on the schedule preset based on the TDD scheme if the ACK signal includes negative ACK information.

Preferably, the method further comprises: if the STA is located within a range preset with the BS and the ACK signal includes positive ACK information, transmitting the data to an STA located outside the preset range upon receiving an ACK signal including negative ACK information from the STA located outside the preset range.

Preferably, the method further comprises: if the STA is located within a range preset with the BS and the ACK signal includes negative ACK information, requesting the BS to retransmit the data.

In accordance with various embodiments of the present disclosure, a station (STA) in a communication system is provided. The STA includes a receiver configured to receive, from a base station (BS), data transmitted on a group basis through a first sub-frame based on a schedule preset based on a time division duplexing (TDD) scheme; and a transmitter configured to transmit, to the BS, an acknowledgement (ACK) signal based on the received data on a second sub-frame after a first interval from the first sub-frame.

Preferably, the data includes data requested by each of a plurality of STAs included in a group, information related to a number of STAs included in each group, and information related to a configuration used when the data is transmitted in the TDD scheme.

Preferably, the STA further comprises a controller configured to allocate a resource for transmitting the ACK signal based on the number of STAs included in each group on the second sub-frame after the first interval from the first sub-frame based on the schedule preset based on the TDD scheme.

Preferably, the receiver is configured to receive, from the BS, the data again through a third sub-frame after a second interval from the first sub-frame based on the schedule preset based on the TDD scheme if the ACK signal includes negative ACK information.

Preferably, if the STA is located within a range preset with the BS and the ACK signal includes positive ACK information, the transmitter is configured to transmit the data to an STA located outside the preset range when the receiver receives an ACK signal including negative ACK information from the STA located outside the preset range.

Preferably, if the STA is located within a range preset with the BS and the ACK signal includes negative ACK information, the transmitter is configured to request the BS to retransmit the data.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication circuit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting data in a base station (BS) in a communication system, the method comprising:

transmitting, to a plurality of stations (STAs) included in a group, the data including information indicating a quantity of STAs included in the group and a quantity of STAs included in other groups, based on a time division duplexing (TDD) scheme;

receiving response signals from each of the plurality of STAs through a resource, wherein the resource is allocated sequentially for each STA based on the information indicating the quantity of STAs included in the group and the quantity of STAs included in the other groups;

in case that a negative acknowledgement (NACK) signal is received from a STA in the group, retransmitting the data to the plurality of STAs included in the group, wherein the STA which transmitted the NACK signal is located within a predetermined distance from the BS; and in case that a NACK signal is received from a STA in the group, retransmitting the data only to the STA, wherein the STA which transmitted the NACK signal is located outside the predetermined distance from the BS.

2. The method of claim 1, wherein the data includes data requested by the each STA, and information related to a configuration used when the data is transmitted based on the TDD scheme.

3. The method of claim 1, wherein the data is transmitted in a subframe using a non-orthogonal multiple access (NOMA) scheme.

4. A base station (BS) in a communication system, the BS comprising:

a transceiver configured to transmit and receive data; and a controller configured to control the transceiver, wherein the controller is further configured to:

transmit, to a plurality of stations (STAs) included in a group, the data including information indicating a quantity of STAs included in the group and a quantity of STAs included in other groups, based on a time division duplexing (TDD) scheme;

receive response signals from each of the plurality of STAs through a resource, wherein the resource is allocated sequentially for each STA based on the information indicating the quantity of STAs included in the group and the quantity of STAs included in the other groups, in case that a negative acknowledgement (NACK) signal is received from a STA in the group, retransmit the data to the plurality of STAs included in the group, wherein the STA which transmitted the NACK signal is located within a predetermined distance from the BS, and in case that a NACK signal is received from a STA in the group, retransmit the data only to the STA, wherein the STA which transmitted the NACK signal is located outside the predetermined distance from the BS.

5. The BS of claim 4, wherein the data includes data requested by the each STA and information related to a configuration used when the data is transmitted based on the TDD scheme.

6. The BS of claim 4, wherein the data is transmitted in a subframe using a non-orthogonal multiple access (NOMA) scheme.

* * * * *